US008306823B2

(12) United States Patent
Okamoto et al.

(10) Patent No.: US 8,306,823 B2
(45) Date of Patent: Nov. 6, 2012

(54) DIALOG DETECTING APPARATUS, DIALOG DETECTING METHOD, AND COMPUTER PROGRAM PRODUCT

(75) Inventors: Masayuki Okamoto, Kanagawa (JP); Naoki Iketani, Kanagawa (JP); Hideo Umeki, Kanagawa (JP); Sogo Tsuboi, Kanagawa (JP); Kenta Cho, Tokyo (JP); Keisuke Nishimura, Kanagawa (JP); Masanori Hattori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1024 days.

(21) Appl. No.: 12/046,021

(22) Filed: Mar. 11, 2008

(65) Prior Publication Data

US 2008/0243494 A1 Oct. 2, 2008

(30) Foreign Application Priority Data

Mar. 28, 2007 (JP) ................................. 2007-085983

(51) Int. Cl.
*G10L 21/00* (2006.01)

(52) U.S. Cl. ............ 704/270; 704/214; 704/9; 704/233; 455/416

(58) Field of Classification Search .................. 704/270, 704/9, 233; 455/416
See application file for complete search history.

(56) References Cited

U.S. PATENT DOCUMENTS

| | | | | |
|---|---|---|---|---|
| 6,263,049 B1 * | 7/2001 | Kuhn | .......................... | 379/32.01 |
| 6,882,971 B2 * | 4/2005 | Craner | .......................... | 704/246 |
| 7,171,329 B2 * | 1/2007 | Rodman et al. | ................ | 702/150 |
| 7,617,107 B2 * | 11/2009 | Nagai | ............................ | 704/270 |
| 2002/0036694 A1 * | 3/2002 | Merril | ............................ | 348/220 |
| 2004/0167783 A1 * | 8/2004 | Nagai | ............................ | 704/270 |
| 2004/0172252 A1 * | 9/2004 | Aoki et al. | ..................... | 704/270 |
| 2005/0088981 A1 * | 4/2005 | Woodruff et al. | .............. | 370/260 |
| 2006/0067500 A1 * | 3/2006 | Christofferson et al. | | 379/202.01 |
| 2007/0050451 A1 * | 3/2007 | Caspi et al. | .................... | 709/204 |
| 2007/0071206 A1 * | 3/2007 | Gainsboro et al. | ............. | 379/168 |
| 2007/0120871 A1 | 5/2007 | Okamoto et al. | | |
| 2007/0154001 A1 * | 7/2007 | Rambo | .................... | 379/202.01 |

(Continued)

FOREIGN PATENT DOCUMENTS

JP 2001045454 2/2001

(Continued)

OTHER PUBLICATIONS

Decision of a Patent Grant dated Jul. 28, 2009 corresponding to U.S. Appl. No. 12/046,021, filed Mar. 11, 2008.

*Primary Examiner* — Douglas Godbold
(74) *Attorney, Agent, or Firm* — Turocy & Watson, LLP

(57) ABSTRACT

A speech receiving unit receives a user ID, a speech obtained at a terminal, and an utterance duration, from the terminal. A proximity determining unit calculates a correlation value expressing a correlation between speeches received from plural terminals, compares the correlation value with a first threshold value, and determines that the plural terminals that receive the speeches whose correlation value is calculated are close to each other, when the correlation value is larger than the first threshold value. A dialog detecting unit determines whether a relationship between the utterance durations received from the plural terminals that are determined to be close to each other within an arbitrarily target period during which a dialog is to be detected fits a rule. When the relationship is determined to fit the rule, the dialog detecting unit detects dialog information containing the target period and the user ID.

8 Claims, 11 Drawing Sheets

U.S. PATENT DOCUMENTS

| | | | |
|---|---|---|---|
| 2007/0291918 A1* | 12/2007 | Diethorn | 379/202.01 |
| 2008/0037446 A1* | 2/2008 | Zhou et al. | 370/260 |
| 2008/0077869 A1* | 3/2008 | Cho et al. | 715/753 |
| 2008/0079693 A1 | 4/2008 | Okamoto et al. | |
| 2008/0233934 A1* | 9/2008 | Diethorn | 455/416 |
| 2008/0244056 A1 | 10/2008 | Okamoto et al. | |

FOREIGN PATENT DOCUMENTS

| | | |
|---|---|---|
| JP | 2004-030293 | 1/2004 |
| JP | 2006066988 | 3/2006 |

\* cited by examiner

FIG.2

| STARTING TIME AND DATE | ENDING TIME AND DATE | CONFERENCE NAME | PLACE | USER ID OF CONFERENCE PARTICIPANT |
|---|---|---|---|---|
| 20060922 10:00 | 20060922 12:00 | XX PJ | CONFERENCE ROOM A | (USER A, USER B) |
| 20060927 13:15 | 20060922 13:15 | YY DEVELOPMENT | CONFERENCE ROOM B | (USER A, USER D, USER E) |
| ... | ... | ... | ... | ... |

| USER ID | STARTING TIME AND DATE | ENDING TIME AND DATE | SPEECH DATA | CONFERENCE NAME | DATA ID | REFERENCE DATA NAME |
|---|---|---|---|---|---|---|
| ... | ... | ... | ... | ... | ... | ... |
| USER A | 20060921 17:15:39 | 20060921 17:15:43 | (OMITTED) | XX PJ | abc | YY PLANNING DOCUMENT.DOC |
| USER A | 20060921 17:16:20 | 20060921 17:16:40 | (OMITTED) | XX PJ | abc | YY PLANNING DOCUMENT.DOC |
| ... | ... | ... | ... | ... | ... | ... |
| USER B | 20060922 18:59:30 | 20060922 18:59:35 | (OMITTED) | | abc | YY PLANNING DOCUMENT.DOC |
| ... | ... | ... | ... | ... | ... | ... |

| STARTING TIME AND DATE | ENDING TIME AND DATE | DIALOG PARTICIPANT | DATA USER | REFERENCE DATA NAME |
|---|---|---|---|---|
| 20060922 10:00:05 | 20060922 10:25:13 | USER A USER B | USER A | YY PLANNING DOCUMENT.DOC |
| 20060922 10:00:05 | 20060922 10:25:13 | USER A USER B | USER B | YY DRAWING.PPT |
| ... | ... | ... | ... | ... |
| 20060925 19:32:48 | 20060925 19:37:50 | USER D USER E USER F | | |
| ... | ... | ... | ... | ... |

FIG.9

DATE: SEPTEMBER 25, 2006

FROM: ITOH

TO: MR. SUZUKI

DEAR MR. SUZUKI,

THIS IS ITOH.
THANK YOU FOR THE MEETING YESTERDAY.

I WOULD LIKE TO ASK YOU SOMETHING ABOUT THE DOCUMENT docid:abc YOU EXPLAINED TO US YESTERDAY.
......

DIALOG DETECTING APPARATUS, DIALOG DETECTING METHOD, AND COMPUTER PROGRAM PRODUCT

CROSS-REFERENCE TO RELATED APPLICATIONS

This application is based upon and claims the benefit of priority from the prior Japanese Patent Application No. 2007-85983, filed on Mar. 28, 2007; the entire contents of which are incorporated herein by reference.

BACKGROUND OF THE INVENTION

1. Field of the Invention

The present invention relates to an apparatus, a method, and a computer program product for detecting a dialog from plural input speeches.

2. Description of the Related Art

In recent years, there has been an increasing opportunity of using electronic information operation devices, such as an input device, a sensor, a display device, and a personal computer that handle audio, images, and videos. For example, there is a mode of using a projector and a monitor of a personal computer to project presentation data and reference the data in explanations and discussions. In the mode of using an electronic whiteboard, information can be written to presentation information, by detecting a position of a pen and a fingertip operated on the electronic whiteboard.

After the communication action, or during the action, it is often necessary to search information or confirm presence of conversations or communications, based on the content of the past communications, such as to confirm with whom a conversation was made at a certain time and date, or when the last conversation with a certain person was made, or to whom certain data was shown.

To carry out this work, first the occurrence of the communication itself needs to be detected. For this purpose, it is considered possible to use a method of detecting whether the communications can be carried out using terminals having a function of carrying out mutual communications. However, according to this method, while the presence of terminals around can be detected, it is not possible to determine whether the communications are actually carried out using the terminals.

That is, according to this method, it is possible to detect information about "who was present nearby at a certain time and date", "when was a certain person present nearby" or "who was present when certain data was disclosed". However, according to this method, detection of communications as an intended purpose cannot be achieved. When communications are carried out on a corridor, not in the environment of established facility such as an office or a conference room, facility and terminals having the communication function are not always present. Therefore, not only communications but also presence of a person nearby cannot be detected.

On the other hand, regarding the method of managing the communication state, there are many proposals of techniques of managing data and object relevant to the communications after carrying out the communications mainly at a conference, and techniques of easily detecting data.

For example, JP-A 2004-30293 (KOKAI) proposes a technique of collectively managing information and relevant data used in the works and communications. According to the method disclosed in JP-A 2004-30293 (KOKAI), various kinds of information such as a position of a person relevant to the operation, time, content of the operation, and information storage destination are recorded as a work list, by relating these pieces of information to each other. With this arrangement, operability of understanding the content of information relevant to the operation can be improved.

However, according to the method disclosed in JP-A 2004-30293 (KOKAI), processing load is large, because many pieces of information need to be input by relating them to each other. Further, although speeches are input, the speeches are recorded by simply relating the speeches to other information, and therefore a dialog cannot be detected from the speeches. As a result, information cannot be detected from the dialog state.

SUMMARY OF THE INVENTION

According to one aspect of the present invention, a dialog detecting apparatus is capable of connecting to a plurality of terminals and capable of obtaining a speech of a user The dialog detecting apparatus includes a speech receiving unit that receives the speeches from the plurality of the terminals, each speech accompanying with a terminal ID identifying one of the terminals and an utterance duration of one of the speeches; a proximity determining unit that calculates a correlation value expressing a correlation between speeches received by the plurality of terminals, compares the correlation value with a predetermined first threshold value, and determines that the plurality of terminals which receive a plurality of speeches whose correlation value is calculated are close to each other, when the correlation value is larger than the first threshold value; and a dialog detecting unit that determines whether a relationship between utterance durations fits a predetermined rule, the utterance durations being received from the plurality of terminals that are determined to be close to each other in an arbitrarily target period, and detects dialog information containing the target period during which the relationship is determined to fit the rule and the terminal IDs received from the plurality of terminals that are determined to be close to each other.

According to another aspect of the present invention, a dialog detecting method is performed in a dialog detecting apparatus which is capable of connecting to a plurality of terminals and capable of obtaining a speech of a user. The dialog detecting method includes receiving the speeches from the plurality of the terminals, each speech accompanying with a terminal ID identifying one of the terminals, and an utterance duration of one of the speeches; calculating a correlation value expressing a correlation between speeches received by the plurality of terminals; comparing the correlation value with a predetermined first threshold value; determining that the plurality of terminals which receive a plurality of speeches whose correlation value is calculated are close to each other, when the correlation value is larger than the first threshold value; determining whether a relationship between utterance durations fits a predetermined rule, the utterance durations being received from the plurality of terminals that are determined to be close to each other in an arbitrarily target period; and detecting dialog information containing the target period during which the relationship is determined to fit the rule and the terminal identifications received from the plurality of terminals that are determined to be close to each other.

A computer program product according to still another aspect of the present invention causes a computer to perform the method according to the present invention.

BRIEF DESCRIPTION OF THE DRAWINGS

FIG. 2 is a diagram illustrating an example of a data structure of schedule information;

FIG. 3 is a diagram illustrating an example of a data structure of speech information;

FIG. 4 is a diagram illustrating an example of a data structure of dialog information;

FIG. 9 is a diagram illustrating an example of an inquiry screen;

DETAILED DESCRIPTION OF THE INVENTION

Exemplary embodiments of an apparatus, a method, and a program for detecting a dialog according to the present invention will be explained below in detail with reference to the accompanying drawings.

A dialog detecting apparatus according to a first embodiment of the present invention receives an input of a speech that each terminal obtains from each user, and analyzes a relationship between the input speeches, thereby detecting a dialog between users.

Figure 1:
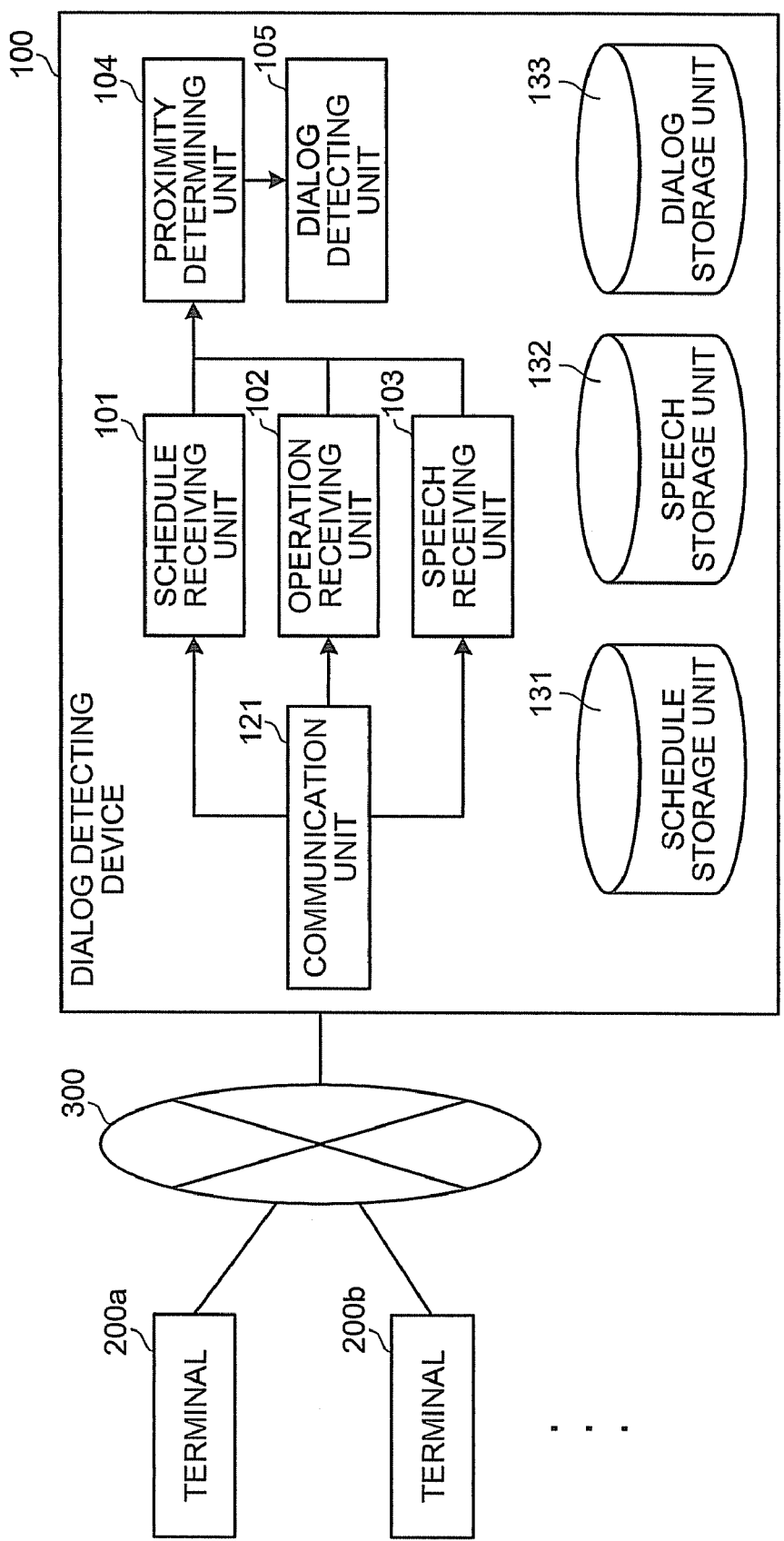
FIG. 1 is a block diagram of a dialog detecting apparatus according to a first embodiment of the present invention.

As shown in FIG. 1, a dialog detecting apparatus 100 is connected to plural terminals 200a and 200b (hereinafter, terminals 200), via a network 300 such as the Internet and a local area network (LAN). The form of the network 300 is not limited to the above, and can be wired or wireless.

Each terminal 200 has a function of receiving an input of a user speech with a microphone (not shown), and transmitting the input speech to the dialog detecting apparatus 100. The terminal 200 can be configured by a portable personal computer (PC) with a speech obtaining unit such as a microphone, or a mobile handheld device such as a portable telephone and a speech recorder.

The dialog detecting apparatus 100 according to the first embodiment is a server apparatus having a function of detecting a dialog based on a speech input from each terminal 200. The dialog detecting apparatus 100 includes a schedule storage unit 131, a speech storage unit 132, a dialog storage unit 133, a communication unit 121, a schedule receiving unit 101, an operation receiving unit 102, a speech receiving unit 103, a proximity determining unit 104, and a dialog detecting unit 105.

The schedule storage unit 131 stores schedule information that expresses a user action schedule input from each terminal 200. As shown in FIG. 2, the schedule information includes a conference starting time and date, a conference ending time and date, a conference name, a conference place, and a user identification (ID) list for identifying a user as a conference attendant.

While FIG. 2 depicts an example of storing a schedule relevant to the conference as schedule information, any kind of information can be used as schedule information so far as the information expresses a schedule of a user action. The schedule storage unit 131 is referenced when the proximity determining unit 104 described later determines a user who is to be calculated as a cross correlation value.

The speech storage unit 132 stores speech information relevant to the speech received by the speech receiving unit 103. In the first embodiment, the speech storage unit 132 further stores the operation information received by the operation receiving unit 102, by relating this information to the speech information.

As shown in FIG. 3, the speech information includes a user ID of a user who uses the terminal 200 from which the user inputs a speech, a starting time and date of an utterance duration, an ending time and date of the utterance duration, speech data as an electric signal of a speech, a conference name, a data ID for identifying the data referenced in relation to the speech, and a reference document name. A terminal ID for identifying the terminal can be used in place of the user ID, as information for specifying the input source.

For the speech data, data that expresses a change of the speech level (sound volume) during the utterance duration is stored. For the speech data, the speech signal itself or other characteristic volume relevant to the speech can be stored in the speech storage unit 132.

Because various kinds of information are not necessarily input simultaneously from the terminals 200 to the dialog detecting apparatus 100, the speech storage unit 132 is used as a constituent part that temporarily stores the information, in the first embodiment. When the information is input in real time from the terminals 200, the provision of the speech storage unit 13 is not always necessary.

The dialog storage unit 133 stores dialog information relevant to the dialog detected by the dialog detecting unit 105. As shown in FIG. 4, the dialog information includes a starting time and date of a dialog, an ending time and date of a dialog, a dialog participant as a user ID list of a user who attends a dialog, a data user as a user ID of a user who uses data, and a reference data name. The data user and the reference data name are not set when the data is not referenced. The dialog information can be structured to include other operation information.

The schedule storage unit 131, the speech storage unit 132, and the dialog storage unit 133 can be configured by any storage medium that is generally used such as a hard disk drive (HDD), an optical disk, a memory card, and a random access memory (RAM).

Referring back to FIG. 1, the communication unit 121 transmits and receives information to and from the terminals 200. The communication unit 121 includes an interface function corresponding to a network mode used by a wired LAN, a wireless LAN, and the Bluetooth.

The schedule receiving unit 101 receives the input of schedule information from the terminals 200 via the communication unit 121. In the first embodiment, the schedule receiving unit 101 receives the input of schedule information immediately after starting the dialog detecting apparatus 100 and by the time before starting communications. The input timing is not limited to this, and schedule information can be input at an arbitrarily timing.

The operation receiving unit 102 receives the input of operation information expressing the content of the operation carried out by the user on the terminal 200, from the terminal 200 via the communicating unit 121. The operation receiving unit 102 receives the input of operation information expressed by the event or the like detected in the application executed at the terminal 200, or information relevant to the data expressed by the application. The operation receiving unit 102 also receives the input of operation information expressing the content of the operation carried out by a human interface device such as a keyboard mouse (not shown) provided at the terminal 200. The operation information includes a user ID for specifying the input source and the operation time and date.

The speech receiving unit 103 receives from each terminal 200 speech information containing speech data in an interval (an utterance duration) during which a speech of a constant level or above occurs. The speech information contains speech data, an utterance duration of speech data, and a user ID of a user who uses the terminal 200 that specifies the input source. Instead of the operation receiving unit 102 receiving the operation information, the speech receiving unit 103 can receive the speech information to which the operation information is associated beforehand.

The proximity determining unit 104 determines whether each terminal 200 is mutually close to each other, by analyzing the speech data received from each terminal 200. Specifically, the proximity determining unit 104 calculates a cross correlation value expressing a cross correlation between the speech data received from optional two terminals 200. When the cross correlation value is larger than a predetermined threshold value, the proximity determining unit 104 determines that the corresponding two terminals 200 are close to each other. The proximity includes not only a physical closeness but also a case that the two terminals are at a distance at which the terminals can carry out conversations although the actual physical distance is long like a remote conference. An index that expresses the cross correlation between the speech data is not limited to the cross correlation value, and any conventionally-used correlation calculation index can be applied. A method of calculating the cross correlation value is described later.

The dialog detecting unit 105 detects whether speeches received from terminals 200 that are determined to be close to each other form a dialog. The dialog detecting unit 105 determines whether a relationship between utterance durations of plural speeches satisfies a predetermined rule expressing a generation pattern of an utterance duration constituting a dialog. With this arrangement, the dialog detecting unit 105 can determine whether plural speeches form a dialog. When a dialog is detected, the dialog detecting unit 105 generates dialog information containing a detected dialog period (a starting time and date and an ending time and date) and dialog attendants as a list of user ID of users who generate speeches forming a dialog, and stores this dialog information into the dialog storage unit 133.

Figure 5:
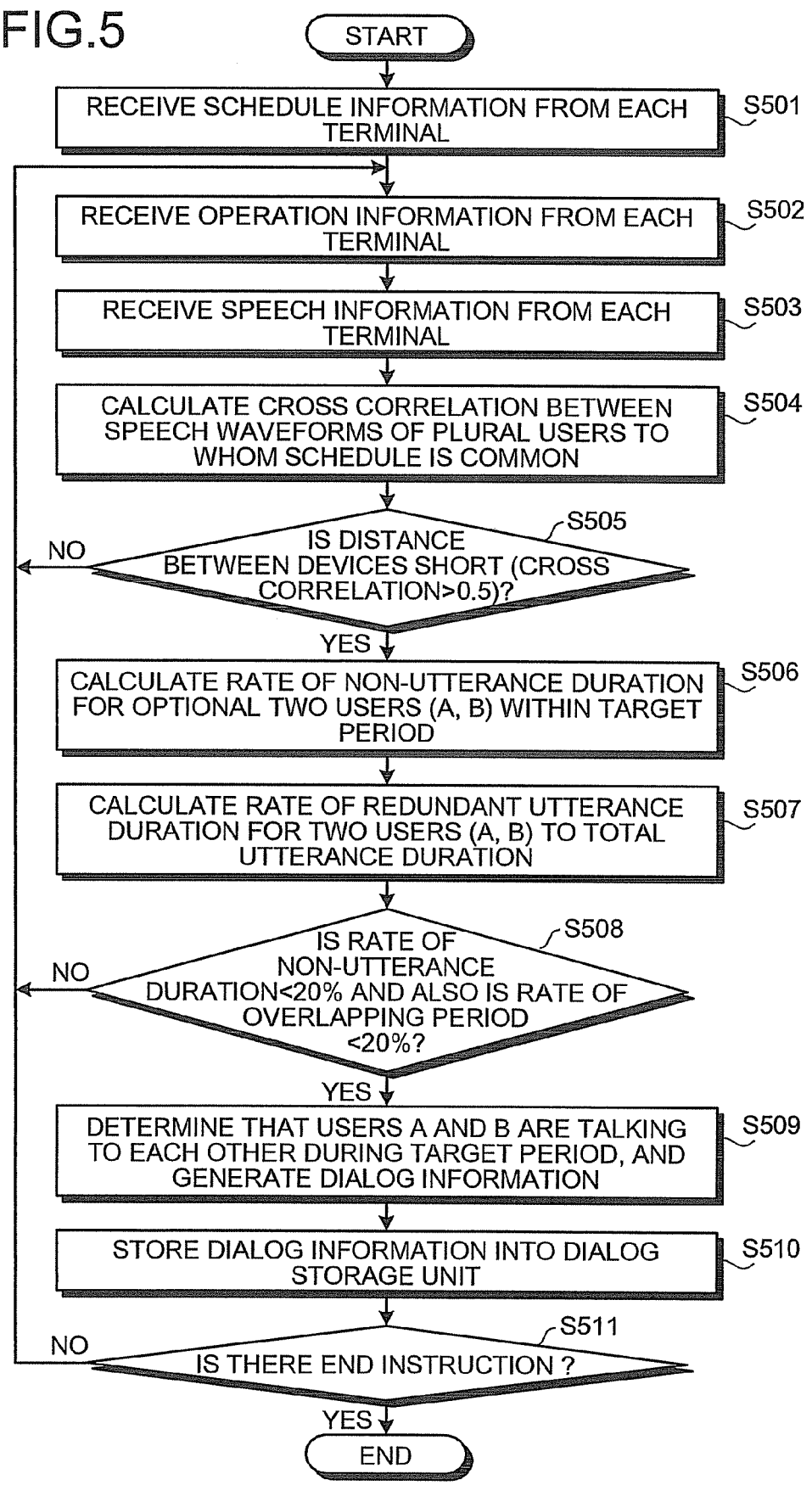
FIG. 5 is a flowchart of an overall flow of a dialog detecting process in the first embodiment.

The dialog detecting process performed by the dialog detecting apparatus 100 according to the first embodiment is explained below with reference to FIG. 5.

The explanation is made below based on the assumption that speech information is continuously input from each terminal 200 during the communications. Alternatively, it can be arranged such that speech information is recorded in each terminal 200 without being connected to the network 300 during the communications, and that when the terminal 200 is connected to the network 300 afterward, the speech information is transmitted to the dialog detecting apparatus 100 together with a time stamp, thereby carrying out the dialog detecting process afterward.

First, when the dialog detecting apparatus 100 starts operating, the schedule receiving unit 101 receives the input of schedule information from the terminal 200 via the communication unit 121 (step S501). When the apparatus starts operating, the input of a speech and the input of operation information are also started.

That is, the operation receiving unit 102 receives the input of the operation information from the terminal 200 via the communication unit 121 (step S502). The speech receiving unit 103 receives the input of speech information from the terminal 200 via the communication unit 121 (step S503).

Next, the proximity determining unit 104 executes a proximity determining process of determining whether plural terminals 200 are close to each other. First, the proximity determining unit 104 references the schedule storage unit 131, and obtains each user ID from the user ID list of the reference participant as the user to whom the schedule is common. The proximity determining unit 104 calculates a cross correlation value of speech data regarding the speech information corresponding to the user ID of the user to whom the schedule is common, out of the received speech information (step S504).

The method of calculating the cross correlation value is explained with reference to FIG. 6. An example of communications carried out between a user A and a user B is explained below.

Figure 6:
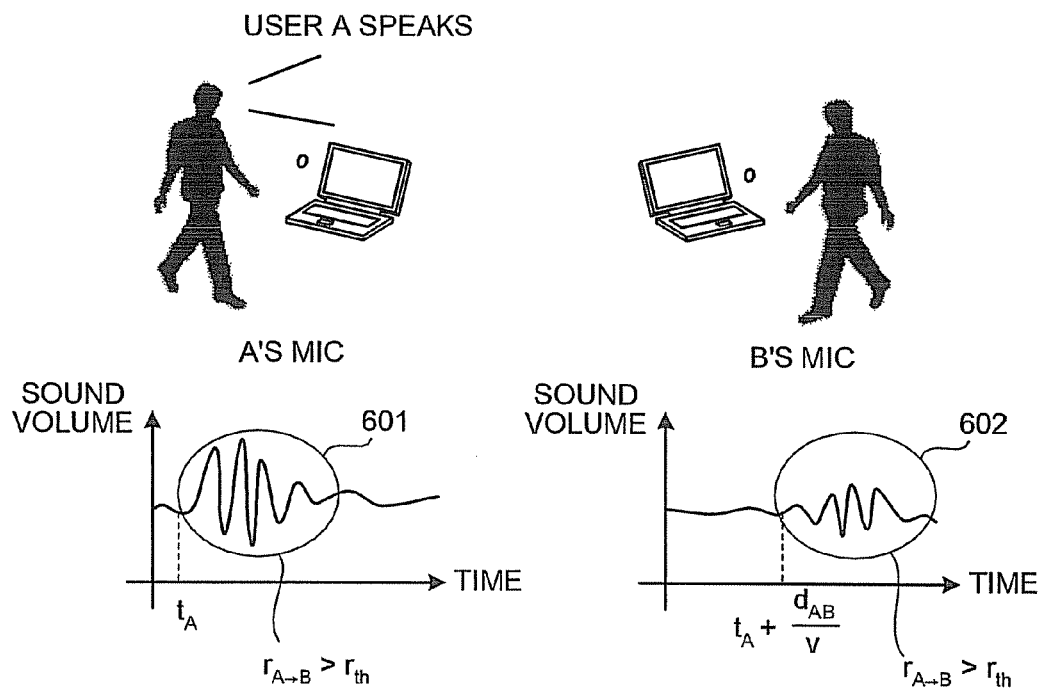
FIG. 6 is a conceptual diagram of a method of calculating a cross correlation of a speech.

As shown in FIG. 6, when the user A talks to the user B at time $t_A$, a speech 601 of the user A is input to the terminal 200 owned by the user A. In this case, when the user B is close by, a speech 602 of the user A is also input to the terminal 200 owned by the user B with attenuation due to a distance and an input angle, after time $t_A + d_{AB}/v$ (where $d_{AB}$ denotes a distance between the user A and the user B, and v denotes sound velocity).

Similarly, when the user B talks to the user A, the speech is input to both the terminal 200 owned by the user B and the terminal 200 owned by the user A. In this case, an attenuated speech of the user B is input to the terminal 200 at the user A side.

In this case, when a distance between the terminal 200 owned by the user A and the terminal 200 owned by the user B is short, a cross correlation is generated between speech levels of the speech input to both terminals 200. Therefore, a cross correlation value ($r_{A \rightarrow B}$ in FIG. 6) of the speech input to the respective terminals 200 is calculated. When the calculated cross correlation value is larger than a predetermined threshold value $r_{th}$, it can be determined that there is a high possibility that the terminal 200 owned by the user A and the terminal 200 owned by the user B are present close to each other.

The method of calculating the cross correlation value is explained in detail below. Regarding two waveforms f(t) and g(t) that express a change of a speech level, when the waveform g is delayed from the waveform f by time m, cross correlation value $C_{fg}$(m) that expresses the strength of the correlation between both waveforms during an interval N is calculated as follows.

First, averages $f_{ave}$ and $g_{ave}$ that express average values of the waveform f and the waveform g during a total interval N are expressed by the following equations (1) and (2), respectively.

$$f_{ave} = \left(\frac{1}{N}\right) \sum_{t=0}^{N-1} f(t) \tag{1}$$

$$g_{ave} = \left(\frac{1}{N}\right) \sum_{t=0}^{N+m-1} g(t) \tag{2}$$

Next, the waveforms that are corrected based on the calculated averages are expressed as f'(t)=(t)−f$_{ave}$ and g'(t)=g(t)−g$_{ave}$. A cross correlation value C$_{ft}$ (m) can be obtained from the following equation (3).

$$C_{ft}(m) = \left(\frac{1}{N}\right)\sum_{t=0}^{N-1} f'(t)g'(t+m) \quad (3)$$

To handle the interval within a range from −1 to 1, a normalized cross correlation R$_{ft}$ (m) is calculated by the following equation (4). C$_{ff}$(0) and C$_{gg}$ (0) in the equation (4) are expressed by the following equations (5) and (6), respectively.

$$R_{ft}(m) = \frac{C_{ft}(m)}{\left(\sqrt{C_{ff}(0)}\sqrt{C_{gg}(0)}\right)} \quad (4)$$

$$C_{ff}(0) = \left(\frac{1}{N}\right)\sum_{t=0}^{N-1} f'^2(t) \quad (5)$$

$$C_{gg}(0) = \left(\frac{1}{N}\right)\sum_{t=0}^{N+m-1} g'^2(t) \quad (6)$$

N is assumed as 5 seconds, and m is calculated to maximize R$_{ft}$ (m), for example. When R$_{ft}$ (m) is larger than 0.5 as a predetermined threshold value, the same speech is assumed to have been simultaneously input to the two terminals 200. In this case, it can be determined that the two terminals 200 are close to each other. The above values of N (5 seconds) and the threshold value (0.5) are one example, and are not limited to these values.

When the above calculation of the cross correlation is carried out for all combinations of users, the number of combinations has a risk of becoming large. Therefore, in the first embodiment, as explained at step S504, the range of combinations is limited by using schedule information. That is, the cross correlation of a speech is calculated among the users who are recorded as conference participants in the schedule information.

The method of limiting the range of combinations is not limited to the above, and any method can be applied when the method is for limiting the combinations of users to those who have a possibility of being close to each other, such as a method of limiting users to those who are present in the same network or limiting user to those who are in the same unit. Not only limiting the combinations, priority orders can be given to users who satisfy a predetermined condition, and the cross correlation between speeches can be calculated following the priority orders.

Referring back to FIG. 5, after the cross correlation value is calculated in the above method at step S504, the proximity determining unit 104 determines whether the distance between the terminals 200 is short, depending on whether the cross correlation value is larger than a predetermined threshold value (for example 0.5) (step S505).

When the distance between the terminals 200 is not short (NO at step S505), the process returns to a receiving process of the operation information (step S502). The proximity determining unit 104 determines a distance between the corresponding terminals 200 by calculating a cross correlation value for all combinations of users. When it is determined that the distance between any terminal 200 is short, the process returns to step S502, and the process is repeated.

When a distance between the terminals 200 is short (YES at step S505), the dialog detecting unit 105 determines whether the speeches input from the terminals 200, the distance between which is determined short, form a dialog (steps S506 to step S509).

Details of the determining process performed by the dialog detecting unit 105 are explained next. As described above, when the user A talks to the user B, the speech input to the terminal 200 of the user B is more attenuated than the speech input to the terminal 200 of the user A, and when the user B talks to the user A, the speech input to the terminal 200 of the user A is more attenuated than the speech input to the terminal 200 of the user B. Accordingly, the dialog detecting unit 105 can identify which one of the cross-correlated speeches is issued by the user A and which one of the cross-correlated speeches is issued by the user B.

Figure 7:
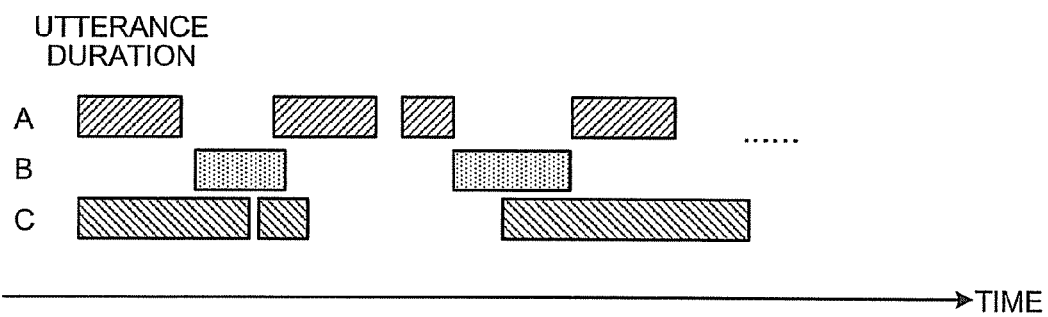
FIG. 7 is a diagram illustrating an example of an utterance duration.

FIG. 7 is a schematic diagram illustrating one example of an utterance duration by each user obtained in the manner described above. FIG. 7 depicts a relationship between utterance durations of users A, B, and C who are close to each other, when the users A and B are talking to each other, the user C is not talking with either the user A or the user B.

In the first embodiment, when a speech occurs at or above a predetermined rate (80%, for example) within a constant time and when a period that can be classified to the speech of the user A or the speech of the user B is at or above a predetermined rate (80%, for example) within the total utterance duration, the dialog detecting unit 105 determines that the user A and the user B are communicating to each other.

In other words, when the rate of a non-utterance duration as a duration during which an utterance is not present during a constant time is less than a predetermined value (20%, for example) and when the rate of a overlapping period during which the utterances of the user A and the user B are overlapping during the total utterance duration of the user A and the user B is less than a predetermined value (20%, for example), the dialog detecting unit 105 determines that the user A and the user B are communicating to each other.

In the example shown in FIG. 7, the utterance duration of the user C and the utterance duration of either the user A or the user B do not satisfy the above condition. Therefore, the dialog detecting unit 105 determines that the user C and the user A are not communicating with each other and the user C and the user B are not communicating with each other. For example, this situation occurs when the user A and the user C are incidentally close to each other but when the user A and the user C are not talking to each other.

The predetermined values are examples, and other numerical values can also be used according to need. The rules for detecting a dialog are not limited to the above, and any rule can be used when the rule is applied to determine a generation pattern of an utterance duration of speeches that constitute a dialog.

For example, out of the above conditions, one of the condition of the speech occurrence rate and the condition of the speech classification can be used. When it can be expected that a speech is not input to each terminal 200 at a position in excess of a constant distance, presence of a dialog can be determined based on only whether a cross correlation is at or above a threshold value, without using a condition relevant to the occurrence rate of the speech or the classification of a speech.

Referring back to FIG. 5, the processing flow of the determining process performed by the dialog detecting unit 105 is explained. First, the dialog detecting unit 105 calculates a rate of a non-utterance duration within an arbitrarily period during which a dialog is to be detected, for arbitrarily two users (the user A and the user B, for example) out of the users corresponding to the terminals 200 that are determined to be close to each other (step S506).

Next, the dialog detecting unit 105 calculates a rate of an overlapping period of the utterances of the user A and the user B in the total utterance duration that expresses a period during which an utterance of either the user A or the user B is present (step S507).

Next, the dialog detecting unit 105 determines whether the rate of the non-utterance duration is smaller than 20% and also whether the rate of the overlapping period is smaller than the predetermined period 20% (step S508). When the rate of the non-utterance duration is not smaller than 20% and also whether the rate of the overlapping period is not smaller than the predetermined period 20% (NO at step S508), the process returns to the receiving process of operation information, the process is repeated (step S502).

When the rate of the non-utterance duration is smaller than 20% and also whether the rate of the overlapping period is smaller than the predetermined period 20% (YES at step S508), the dialog detecting unit 105 determines that the user A and the user B are talking to each other during the concerned period, and generates dialog information (step S509).

The dialog information includes at least a starting time and date of a concerned period, an ending time and date of a concerned period, and dialog participants (the user A and the user B). When the operation time and date within the operation information received at step S502 is included in the concerned period, the dialog detecting unit 105 can generate dialog information to which the operation information is related.

The dialog detecting unit 105 stores the generated dialog information into the dialog storage unit 133 (step S510). Instead of the dialog detecting unit 105 detecting the dialog information containing the operation information, the operation receiving unit 102 can store the received operation information at an arbitrarily timing by relating this information to the dialog information.

The dialog detecting unit 105 determines whether a control unit (not shown) has instructed to end the dialog detecting apparatus (step S511). When there is not end instruction (NO at step S511), the process returns to the receiving process of operation information, and the process is repeated (step S502). When there is an end instruction (YES at step S511), the dialog detecting process ends.

Based on the above process, communications (dialog) between users who use the terminals 200 can be detected using speech information that can be easily obtained at each terminal 200, and the dialog can be stored in the dialog storage unit 133 as a record. When operation information such as a relevant material name is present, the operation information can also be stored in the dialog storage unit 133. Therefore, a user can search a communication state and can search relevant information based on the communication state.

Figure 8:
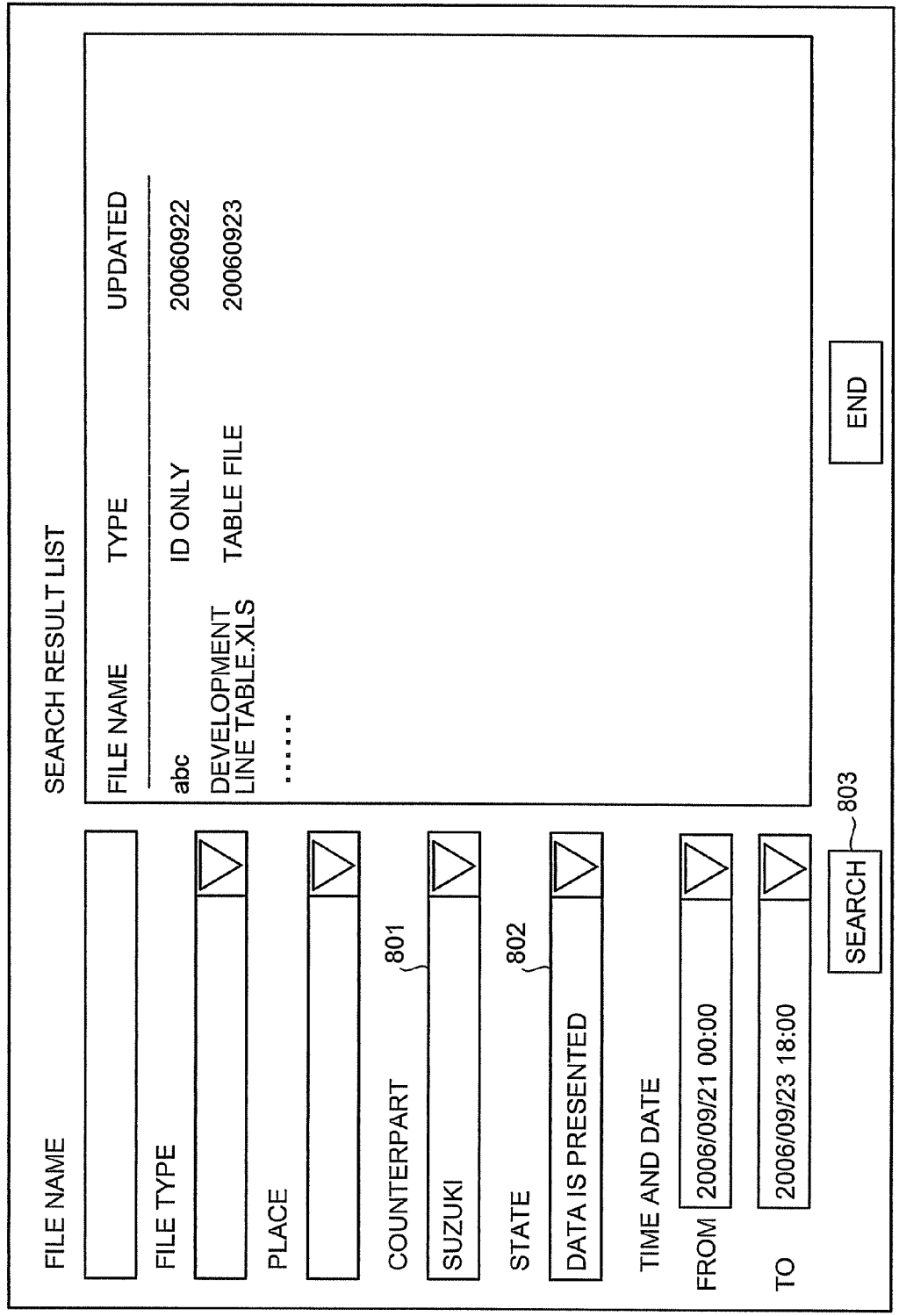
FIG. 8 is a diagram illustrating an example of a search screen.

FIG. 8 is a schematic diagram for explaining an example of a search screen for searching data using stored dialog information. As shown in FIG. 8, in the first embodiment, data can be searched using a conference place, a communication counterpart, a communication state, and a communication time and date as search keys. The search keys are not limited to these, and other items such as a conference name and a data ID that are stored in the dialog storage unit 133 can also be assigned as search keys.

FIG. 8 depicts an example of a result of a search screen when a certain user inputs a user name 801 of a user as the other dialog counterpart and a state 802 corresponding to "data is presented", and depresses a search button 803. Based on this operation, the user obtains an ID "abc" that specifies a file referenced in the communications, and can enquire the user as the other communication counterpart, using the obtained ID.

FIG. 9 depicts an example of an inquiry screen for making an inquiry using e-mail. In FIG. 9, a file ID is added to a prefix called "docid:" to indicate that this is a reference to the file.

While a detection of a dialog between two users (the user A and the user B) is explained so far, presence of a dialog between three or more users is also possible. For example, in the above example shown in FIG. 7, presence of communications between three users can be detected by totaling combinations of the user A, the user B, and a user C. Even when a rate of an utterance duration is small based on a determination using combinations of arbitrarily two users, a state of communications between three or more users can be detected by calculating an occurrence rate in the total utterance duration and a rate of duplication of utterance durations for the utterance duration of the three or more users.

As described above, the dialog detecting apparatus according to the first embodiment can detect a dialog between users, by analyzing a relationship between speeches that can be easily obtained at terminal that the users use. Accordingly, the dialog detecting apparatus can also detect a small scale dialog such as a conversation incidentally made at a position with insufficient communication facility, not only conversations in a conference room with sufficient communication facility. Because a conversation can be detected from a relationship of speech information, the load of processing can be decreased from that when a conversation is detected by recognizing a speech from speech information and by analyzing a result of recognition.

In the first embodiment, the dialog detecting apparatus as a server apparatus executes all processes relevant to the dialog detecting process. Meanwhile, a dialog detecting apparatus according to a second embodiment of the present invention includes a dialog detecting function within each terminal and can individually execute the dialog detecting process within each terminal based on speech information transmitted and received between the terminals.

Figure 10:
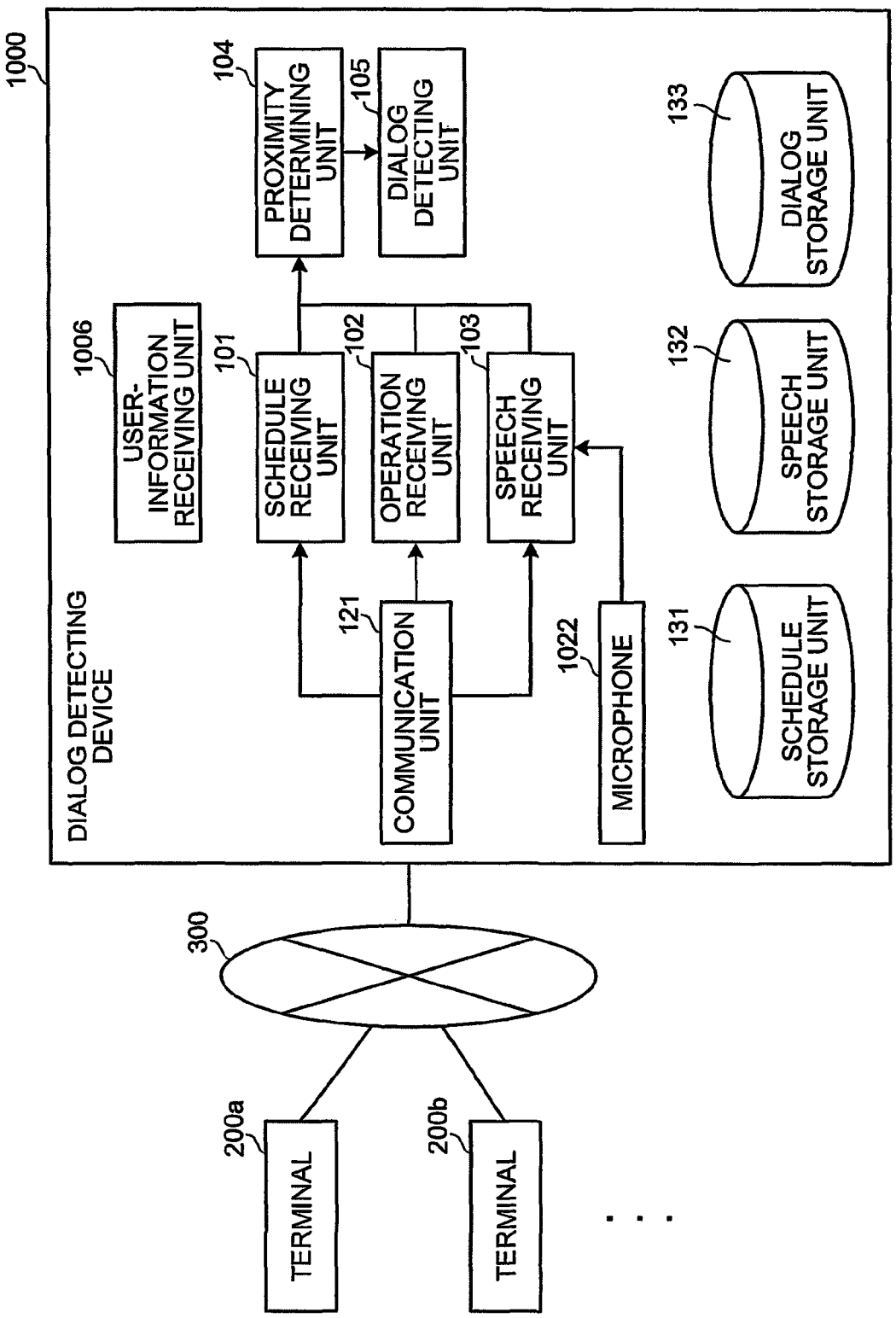
FIG. 10 is a block diagram of a dialog detecting apparatus according to a second embodiment of the present invention.

According to the second embodiment, a dialog detecting apparatus 1000 shown in FIG. 10 includes a mobile handle device such as a portable personal computer (PC) having a microphone, like the terminal 200 according to the first embodiment. The terminal 200 can have only the function of receiving an input of a speech and transmitting the speech like in the first embodiment, or have the dialog detecting function like the dialog detecting apparatus 1000.

As shown in FIG. 10, the dialog detecting apparatus 1000 includes the schedule storage unit 131, the speech storage unit 132, the dialog storage unit 133, the communication unit 121, a microphone 1022, the schedule receiving unit 101, the operation receiving unit 102, a speech receiving unit 1003, the proximity determining unit 104, the dialog detecting unit 105, and a user-information receiving unit 1006.

The second embodiment is different from the first embodiment in that the microphone 1022 and the user-information receiving unit 1006 are additionally provided and that the function of the speech receiving unit 1003 is different from that of the first embodiment. Configurations and functions of other units are similar to those shown in the block diagram of the dialog detecting apparatus 100 as shown FIG. 1 according to the first embodiment, and therefore, these units are assigned with like reference numerals and explanations thereof will be omitted.

The microphone 1022 receives an input of speeches of users. The speech receiving unit 1003 is different from the speech receiving unit 103 according to the first embodiment in that the speech receiving unit 1003 receives speech information from other terminal 200 and also receives a speech of a user who uses the own device input from the microphone 1022.

Therefore, the speech receiving unit 1003 converts the speech input from the microphone 1022 into an electric signal (speech data), and analog-to-digital (A/D) converts the speech data into digital data of a pulse code modulation (PCM) format or the like. These processes can be achieved by using a method similar to the conventionally-used method of digitalizing a speech signal.

The user-information receiving unit 1006 receives the input of a user ID to specify a user who uses the dialog detecting apparatus 1000. The user-information receiving unit 1006 can also be configured to receive the user ID that is input together with the password for authenticating the starting time of using the device, for example.

Figure 11:
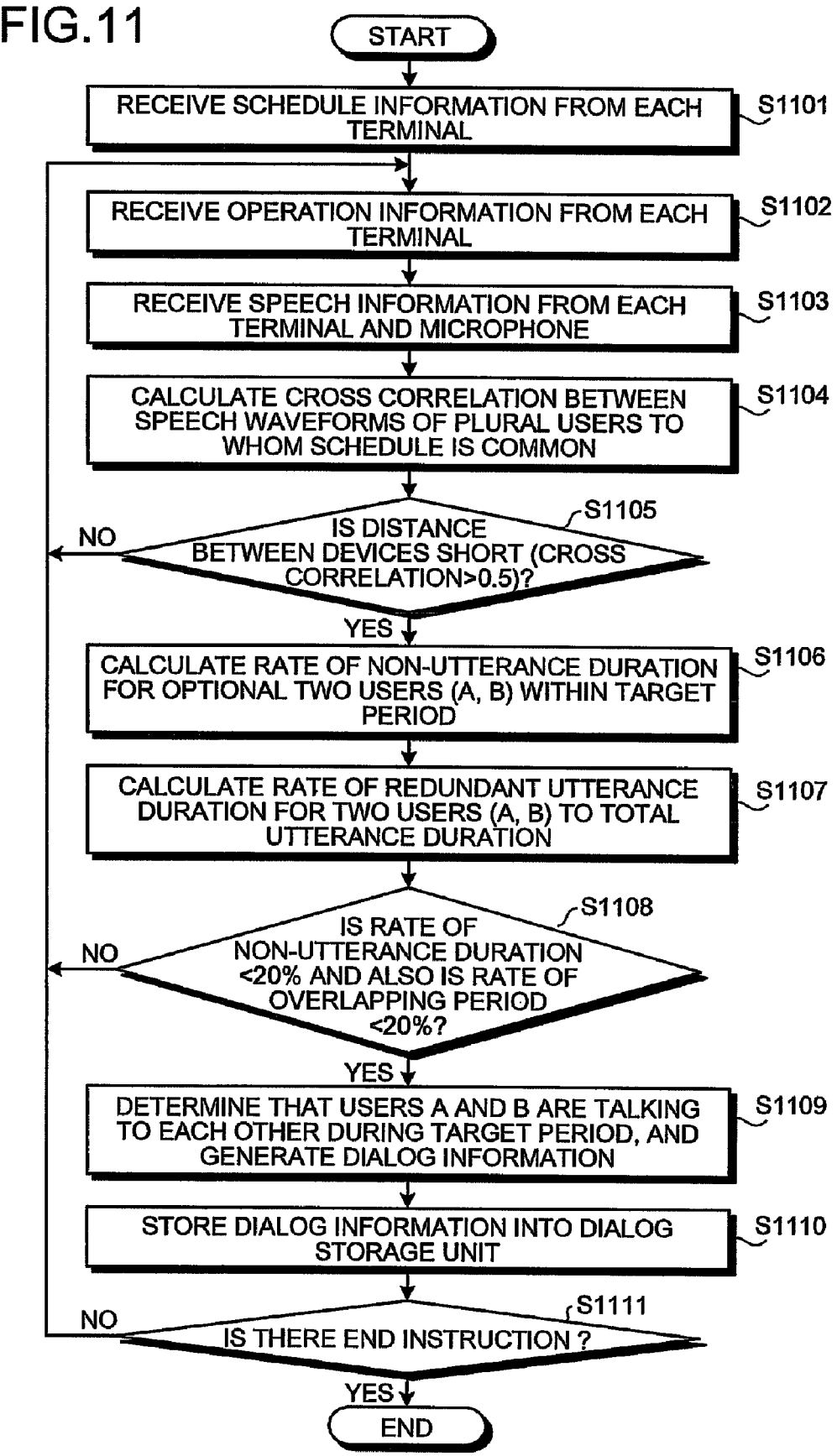
FIG. 11 is a flowchart of an overall flow of a dialog detecting process in the second embodiment.

The dialog detecting process performed by the dialog detecting apparatus 1000 according to the second embodiment having the above configuration is explained next with reference to FIG. 11.

A schedule-information receiving process and an operation-information receiving process at step S1101 and step S1102 are similar to those of the dialog detecting apparatus 100 performed at step S501 and step S502 in the first embodiment, and therefore, explanations thereof will be omitted.

The speech receiving unit 1003 receives speech information from the microphone 1022 as well as from each terminal 200. When speech data is received from the microphone 1022, the speech receiving unit 1003 sets this speech receiving period as an utterance duration. By relating the user ID received by the user-information receiving unit 1006 to the speech data, it becomes possible to obtain information equivalent to the speech information received from the terminal 200.

A correlation-value calculation process, a proximity determination process, and a dialog determining process at step S1104 to step S1111 are similar to those performed by the dialog detecting apparatus 100 at step S504 to step S511 in the first embodiment, and therefore, explanations thereof will be omitted.

In the second embodiment, because the speech of a user who uses the own device can be input as described above, presence of a dialog can be detected by calculating a correlation value between the speech of the user who uses the own device and the speech of the user who uses the other terminal 200. Usually, detection of a dialog relevant to the user him/her self is considered to be desired. Therefore, it can also be configured to detect only a dialog between the user of the own device and the user of the other terminal 200.

As described above, the dialog detecting apparatus according to the second embodiment can detect a dialog within each terminal, by not integrating the dialog detecting process and the detected dialog information on the server apparatus but by transmitting and receiving a speech based on peer-to-peer communication between the terminals.

While the user ID is used as user information in each of the above embodiments, when other information such as biometric information capable of specifying a user is available, this information can also be used.

While speech data that is input at a constant speech level or above is assumed to be used, speech data at an arbitrarily speech level can also be used. It can also be configured to detect environmental sound other than user's speech from input sound and speech, and recognize at least one of the environmental sound and the user's speech, and search and store a dialog by relating the detected information to the dialog information. Input information using various kinds of sensors such as video information or image information of a user picked up with an imaging device such as a camera and position information obtained by a global positioning system (GPS) can be input and stored by relating this input information to the dialog information.

Figure 12:
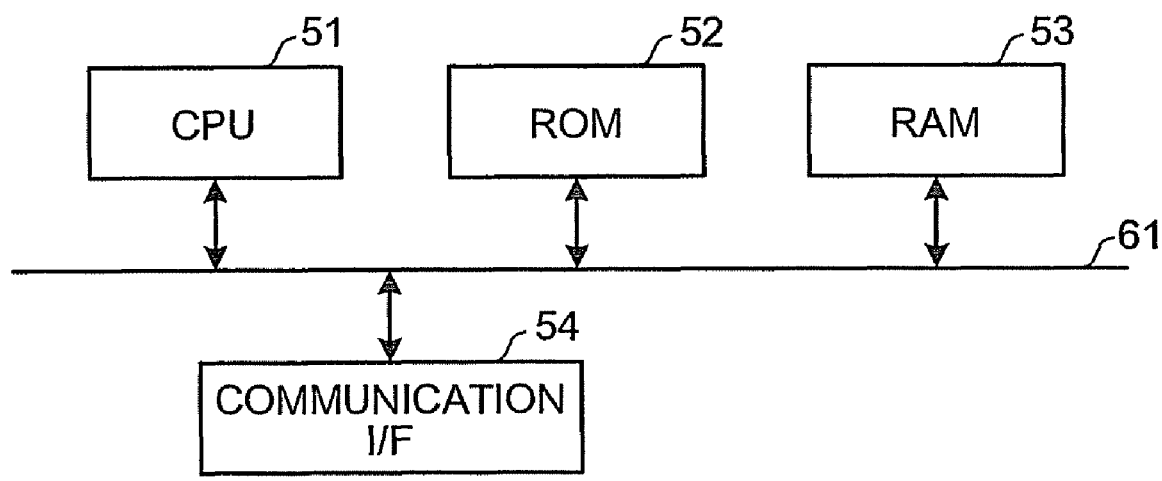
FIG. 12 is a hardware configuration of the dialog detecting apparatus according to the first or second embodiment.

A hardware configuration of the dialog detecting apparatus according to the first or second embodiment is explained below with reference to FIG. 12.

The dialog detecting apparatus according to the first or second embodiment has a hardware configuration using a normal computer, including a control device such as a central processing unit (CPU) 51, storage devices such as a read only memory (ROM) 52 and a RAM 53, a communication interface (I/F) 54 that communicates with the outside by being connected to the network, external storage devices such as a HDD, a compact disk (CD), and a drive device, a display device, input devices such as a keyboard and a mouse, and a bus 61 that connects each unit.

A dialog detecting program executed by the dialog detecting apparatus according to the first or second embodiment is provided by being recorded on a computer-readable recording medium such as compact disk read only memory (CD-ROM), a flexible disk (FD), a compact disk recordable (CD-R), and a digital versatile disk (DVD), in an installable format or an executable format.

The dialog detecting program executed by the dialog detecting apparatus according to the first or second embodiment can be stored in a computer connected to a network such as the Internet, and provided by being downloaded via the network. The dialog detecting program executed by the dialog detecting apparatus according to the first or second embodiment can be provided or distributed via the network such as the Internet.

The dialog detecting program according to the first or second embodiment can be provided by being incorporated in a ROM or the like in advance.

The dialog detecting program executed by the dialog detecting apparatus according to the first or second embodiment has a module configuration including the above units (the schedule receiving unit, the operation receiving unit, the speech receiving unit, the proximity determining unit, and the dialog detecting unit). As actual hardware, the CPU 51 (the processor) reads and executes the dialog detecting program from the recording medium, thereby loading each unit onto the main storage device, and generating each load on the main storage device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A dialog detecting apparatus capable of connecting to a plurality of terminals and capable of obtaining a speech of a user, comprising:

a speech receiving unit that receives the speeches from the plurality of the terminals, each speech accompanying with a terminal ID identifying one of the terminals and an utterance duration of one of the speeches;

an operation receiving unit that receives operation information associated with a data ID that identifies a reference data being relevant to the speech and an operation time and date in association with each other, the operation time and date indicating a time and date when the reference data is operated;

a proximity determining unit that calculates a correlation value expressing a correlation between speeches received by the plurality of terminals, compares the correlation value with a predetermined first threshold value, and determines that the plurality of terminals which receive a plurality of speeches whose correlation value is calculated are close to each other, when the correlation value is larger than the first threshold value;

a dialog detecting unit that determines whether a relationship between utterance durations fits a predetermined rule, the utterance durations being received from the plurality of terminals that are determined to be close to each other in an arbitrarily target period, and detects dialog information containing the target period during which the relationship is determined to fit the rule and the terminal IDs received from the plurality of terminals that are determined to be close to each other;

a dialog storage unit that stores the dialog information during the target period containing the operation time and date associated with the received operation information, and the data ID associated with the received operation information in association with each other; and a processing unit for executing at least the dialog detecting unit.

2. The apparatus according to claim 1, wherein the dialog detecting unit determines whether a rate of an overlapping period during which utterance durations received from the plurality of terminals are overlapped to the target period fits the rule expressing that the rate is smaller than a predetermined second threshold value.

3. The apparatus according to claim 2, wherein the dialog detecting unit determines whether the rate of the overlapping period to the target period is smaller than the second threshold value and whether a rate of a non-utterance duration during which the utterance duration is not present within the target period to the target period fits the rule expressing that the rate is smaller than a predetermined third threshold value.

4. The apparatus according to claim 1, further comprising a schedule receiving unit that receives an input of schedule information containing a schedule of an action of a user and the terminal ID of the terminal that the user relevant to the action uses, and the proximity determining unit calculates the correlation value between speeches corresponding to the terminal ID contained in the received schedule information within the speeches received from the plurality of terminals.

5. The apparatus according to claim 1, further comprising a speech storage unit that stores the terminal ID, the speech, and the utterance duration that are received by the speech receiving unit in association with each other, wherein the proximity determining unit calculates a correlation value between the speeches stored in the speech storage unit, compares the calculated correlation value with the first threshold value, and determines that the plurality of terminals that receive speeches whose correlation value is calculated are close to each other, when the correlation value is larger than the first threshold value, and the dialog detecting unit obtains from the speech storage unit utterance durations received from the plurality of terminals that are determined to be close to each other, and determines whether a relationship of the utterance durations obtained during the target period fits the rule.

6. The apparatus according to claim 1, further comprising:

a speech receiving unit that receives an input of a speech of a user; and a user information receiving unit that receives the terminal ID, wherein the proximity determining unit calculates the correlation value between the speech input from the speech receiving unit and the speech received from the terminal, compares the correlation value with the first threshold value, and determines that the terminal which receives the speech and whose correlation value is calculated and the dialog detecting apparatus are close to each other, when the correlation value is larger than the first threshold value, and the dialog detecting unit determines whether a relationship between the utterance duration that is received from the terminal determined to be close to each other and the utterance duration of speech that is input from the speech receiving unit during the target period fits the rule, and detects the dialog information containing the target period when the relationship is determined to fit the rule, a terminal ID received from the terminal determined to be close to each other, and a terminal ID received by the user-information receiving unit.

7. A dialog detecting method performed in a dialog detecting apparatus capable of connecting to a plurality of terminals and capable of obtaining a speech of a user, comprising:

receiving the speeches from the plurality of the terminals, each speech accompanying with a terminal ID identifying one of the terminals, and an utterance duration of one of the speeches;

receiving an operation information associated with a data ID that identifies a reference data being relevant to the speech and an operation time and date in association with each other, the operation time and date indicating a time and date when the reference data is operated;

calculating a correlation value expressing a correlation between speeches received by the plurality of terminals;

comparing the correlation value with a predetermined first threshold value;

determining that the plurality of terminals which receive a plurality of speeches whose correlation value is calculated are close to each other, when the correlation value is larger than the first threshold value;

determining whether a relationship between utterance durations fits a predetermined rule, the utterance durations being received from the plurality of terminals that are determined to be close to each other in an arbitrarily target period;

detecting dialog information containing the target period during which the relationship is determined to fit the rule and the terminal identifications received from the plurality of terminals that are determined to be close to each other; and storing the dialog information during the target period containing the operation time and date associated with the received operation information, and the data ID associated with the received operation information in associated with each other.

8. A computer program product having a non-transitory computer readable medium including programmed instructions for detecting a dialog by connecting to a plurality of terminals capable of obtaining a speech of a user, wherein the instructions, when executed by a computer, cause the computer to perform:

receiving the speeches from the plurality of the terminals, each speech accompanying with a terminal ID identifying one of the terminals, and an utterance duration of one of the speeches;

receiving an operation information associated with a data ID that identifies a reference data being relevant to the speech and an operation time and date in associated with each other, the operating time and date indicating a time and date when the reference data is operated;

calculating a correlation value expressing a correlation between speeches received by the plurality of terminals;

comparing the correlation value with a predetermined first threshold value;

determining that the plurality of terminals which receive a plurality of speeches whose correlation value is calculated are close to each other, when the correlation value is larger than the first threshold value;

determining whether a relationship between utterance durations fits a predetermined rule, the utterance durations being received from the plurality of terminals that are determined to be close to each other in an arbitrarily target period;

detecting dialog information containing the target period during which the relationship is determined to fit the rule and the terminal identifications received from the plurality of terminals that are determined to be close to each other; and storing the dialog information during the target period containing the operation time and date associated with the received operation information, and the data ID associated with the received operation information in association with each other.

* * * * *